US012485691B2

(12) United States Patent
Odden et al.

(10) Patent No.: US 12,485,691 B2
(45) Date of Patent: Dec. 2, 2025

(54) SHAPE CHANGING RIBBON CORE

(71) Applicant: Entrust Corporation, Shakopee, MN (US)

(72) Inventors: Matt Odden, Shakopee, MN (US); Lyle Bungert, Shakopee, MN (US); Alex Zaborowski, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 167 days.

(21) Appl. No.: 18/411,371

(22) Filed: Jan. 12, 2024

(65) Prior Publication Data

US 2024/0239124 A1 Jul. 18, 2024

Related U.S. Application Data

(60) Provisional application No. 63/480,349, filed on Jan. 18, 2023.

(51) Int. Cl.
*B41J 33/00* (2006.01)

(52) U.S. Cl.
CPC .................................. *B41J 33/003* (2013.01)

(58) Field of Classification Search
CPC ...................................................... B41J 33/003
See application file for complete search history.

(56) References Cited

U.S. PATENT DOCUMENTS

| | | | |
|---|---|---|---|
| 4,825,054 A | 4/1989 | Rust et al. | |
| 4,995,501 A | 2/1991 | Lundstrom et al. | |
| 5,266,781 A | 11/1993 | Warwick et al. | |
| 5,837,991 A | 11/1998 | LaManna et al. | |
| 6,131,817 A | 10/2000 | Miller | |
| 6,783,067 B2 | 8/2004 | Kreuter et al. | |
| 6,902,107 B2 | 6/2005 | Shay et al. | |
| 7,398,972 B2 | 7/2008 | Schuller et al. | |
| 7,434,728 B2 | 10/2008 | Paulson et al. | |
| 10,889,129 B2 | 1/2021 | Beech | |
| 2007/0187870 A1 | 8/2007 | Lundstrom et al. | |
| 2014/0292991 A1* | 10/2014 | Aihara | B41J 35/36 347/214 |

FOREIGN PATENT DOCUMENTS

| | | |
|---|---|---|
| JP | 2000141799 A | 5/2000 |
| JP | 2000177222 A | 6/2000 |
| JP | 2008195028 A | 8/2008 |
| JP | 2009126122 A | 6/2009 |
| KR | 20190114378 A | 10/2019 |

OTHER PUBLICATIONS

PCT International Search Report and Written Opinion dated May 10, 2024 for International Application No. PCT/US2024/011338.

* cited by examiner

*Primary Examiner* — Lisa Solomon
(74) *Attorney, Agent, or Firm* — Merchant & Gould P.C.

(57) ABSTRACT

A ribbon core that is used with a consumable ribbon in a card processing system. The ribbon core can be a take-up core that takes-up used ribbon that has been used in a processing operation in the card processing system, or a supply core around which unused ribbon is wound and that is to be used in a processing operation in the card processing system. The ribbon core is configured to accommodate uneven material on the consumable ribbon.

16 Claims, 14 Drawing Sheets

SHAPE CHANGING RIBBON CORE

FIELD

This technical disclosure relates to a ribbon core used with a consumable ribbon in a card processing system that processes personalized cards and passports.

BACKGROUND

A consumable ribbon used in a card processing system is commonly used with a ribbon core which can be a take-up core on which used ribbon is wound or a supply core on which unused, fresh ribbon is unwound during use. The portion of the ribbon core on which the ribbon is wound is commonly a cylinder. For example, FIGS. 1A and 1B illustrate an example of a conventional ribbon core 10 having a cylindrical section 12 on which ribbon (unused or used) is wound during use, and a cap 14 at an end of the cylindrical section 12.

FIG. 1C illustrates an example of a used ribbon 16 that is wound onto the ribbon core 10 after the ribbon 16 has been used in a card processing system. In many instances, the used ribbon 16 is generally evenly wound on the ribbon core 10 and forms a generally uniform cylinder as depicted in FIG. 1C. However, in some ribbons used in card processing systems, the ribbons may accumulate a build-up of material at certain locations on the ribbon during use while other locations of the ribbon do not accumulate material build-up. When such ribbons are wound onto a conventional core, the material build-up can cause an uneven winding of the ribbon onto the ribbon core.

For example, FIG. 2 illustrates an example of a print ribbon 18 that is used in retransfer printing in a process that is often referred to as peel-off. The print ribbon 18 is depicted as including a repeating sequence of panels with each sequence of panels including a cyan (C) color panel 20*a*, a magenta (M) color panel 20*b*, a yellow (Y) color panel 20*c*, and one or more black (K) color panels 20*d*. The material forming the color panels can be ink, dyes, or other colorant material. Each sequence of panels further includes a peel-off panel 20*e* of adhesive material. Each sequence of panels can optionally include a panel of inhibitor material and possibly other panels known in the art. During a retransfer printing process, the peel-off panel 20*e* is mated with a retransfer ribbon (not shown) and removes transferrable material from the retransfer ribbon at one or more locations where the transferrable material is not to be transferred to the surface of a personalized card or a page of passport. FIG. 2 depicts each peel-off panel 20*e* as including two sections 22*a*, 22*b* of transferrable material that have been removed from the retransfer ribbon and transferred to the peel-off panels 20*e*, where the sections 22*a*, 22*b* correspond in location to a magnetic strip and a signature panel of a personalized card (the outline of which shown in broken lines in one of the peel-off panels 20*e* in FIG. 2; the broken line outline would not actually be present on the peel-off panels 20*e*).

Because of the transferrable material at the sections 22*a*, 22*b* in FIG. 2, when the print ribbon 18 is wound onto a take-up core, the sections 22*a*, 22*b* of transferrable material on the peel-off panels 20*e* creates a pair of raised ridges 24*a*, 24*b* corresponding to the locations of the sections 22*a*, 22*b* in the wound, used ribbon 18 with the remainder of the wound, used ribbon remaining generally flat and even. A similar ridge would be created with a build-up of transferrable material at a single section on the peel-off panels 20*e*, or with a build-up of transferrable material at more than two sections on the peel-off panels 20*e*. The ridges 24*a*, 24*b* that build up on the wound, used print ribbon 18 can cause inconsistencies in web tension on unused portions of the print ribbon 18 during operation that can contribute to the presence of wrinkles, woodgraining, and other known image quality issues when performing printing using the unused portions of the print ribbon 18.

SUMMARY

A ribbon core that is used with a consumable ribbon in a card processing system is described. The ribbon core can be a take-up core that takes-up used ribbon that has been used in a processing operation in the card processing system, or a supply core around which unused ribbon is wound and that is to be used in a processing operation in the card processing system.

The ribbon core, whether a take-up core or a supply core, is configured to accommodate build-up of material on the consumable ribbon to offset the material build-up and/or to accommodate removal of material from the consumable ribbon so that the tension on the ribbon is more uniform than the tension encountered in FIG. 3. The build-up and/or removal of material creates uneven material on the consumable ribbon which the ribbon cores described herein can accommodate to maintain a more uniform tension on the ribbon.

The material build-up on the consumable ribbon may occur during use of the consumable ribbon in processing operations on personalized cards or passports in the card processing system, in which case the ribbon core is a take-up core that accommodates the material build-up. Alternatively, the build-up of material may be present on the unused, fresh consumable ribbon, in which case the ribbon core is a supply core that accommodates the material build-up. Or a ribbon core described herein could be used on the take-up side and on the supply side.

The removal of material from the consumable ribbon may occur in a number of instances. For example, in a printing application an ink, a topcoat or other material may be printed in the same general area on a large number of cards, which can lead to creation of a depression in the ribbon wound onto the take-up core, with the depression occurring in the area of the ribbon where the printing takes place. In another example, an overlay material or patch may be transferred from a ribbon to a particular area on a number of cards (for example, a patch overlaying printed portrait images) which can lead to creation of a depression in the ribbon wound onto the take-up core at the location of the transferred overlay material.

In an embodiment, the ribbon core can accommodate uneven material on the ribbon by automatically changing shape while the consumable ribbon is wound thereon. In another embodiment, the ribbon core can accommodate uneven material on the ribbon by being configured with one or more sections with a circumferential shape, for example a reduced diameter, that differs from an adjacent section of the ribbon core. In an embodiment, the ribbon core can be configured to automatically change shape and by being configured with a circumferential shape that differs from an adjacent section of the ribbon core. The automatic shape change and/or the different circumferential shape can be located at an appropriate width on the ribbon core depending upon where the uneven material on the width of the consumable ribbon is located.

The consumable ribbon can be any consumable ribbon used in a card processing system that has uneven material during use of the consumable ribbon, or that has a uneven material prior to use. For example, the consumable ribbon can be a print ribbon used in a retransfer printer that implements peel-off. Peel-off in retransfer printing is known in the art. The peel-off concept can be used in any card processing operation where an area of material may need to be removed from a larger layer of material. For example, the peel-off concept can be used to remove an area of inhibitor material from an inhibitor panel on a thermal transfer print ribbon in a direct-to-card printing process, or used to remove an area of topcoat material from a larger section of topcoat material in a direct-to-card printing process. The build-up of material may also be patches, labels, and other materials.

As used herein, the term "processing" (or the like) as used throughout the specification and claims, unless indicated otherwise, is intended to encompass operations performed on a card or passport that includes operations that result in personalizing the card or passport as well as operations that do not result in personalizing the card or passport. An example of a processing operation that personalizes the card or passport is printing the cardholder's image or name on the card or passport. An example of a processing operation that does not personalize the card or passport is applying a laminate to the card or printing non-cardholder graphics on the card or passport. The term "personalize" is often used in the card/passport industry to refer to cards or passports that undergo both personalization processing operations and non-personalization processing operations. In addition, the term "personalized card" as used throughout the specification and claims, unless indicated otherwise, is intended to encompass cards that have been personalized (or individualized) or cards that are to be personalized in the card processing system. In addition, the term "card processing system" as used throughout the specification and claims, unless indicated otherwise, is intended to encompass systems that process passports or pages of passports.

A ribbon core upon which a consumable ribbon of a card processing system is wound includes a core body around which the consumable ribbon of the card processing system is wound, with the core body having a first axial end and a second axial end. The core body has a first axial section that during use is overlapped by a first section of the consumable ribbon and having a first circumferential shape, and a second axial section that during use is overlapped by a second section of the consumable ribbon. The second axial section has a second circumferential shape that differs from the first circumferential shape of the first axial section, or the second axial section is configured to automatically change its circumferential shape when the second section of the consumable ribbon is wound thereon. The second axial section accommodates uneven material on the second section of the consumable ribbon of the card processing system.

In addition, a ribbon supply of a card processing system includes a core body having a first axial end and a second axial end, and a consumable ribbon wound onto the core body. The core body has a first axial section that is overlapped by a first section of the consumable ribbon and having a first circumferential shape, and a second axial section that is overlapped by a second section of the consumable ribbon and having a second circumferential shape that differs from the first circumferential shape of the first axial section. The second axial section accommodates uneven material on the second section of the consumable ribbon of the card processing system.

In addition, a shape changing ribbon core upon which a consumable ribbon of a card processing system is wound includes a substantially cylindrical core body having a first axial end and a second axial end. The substantially cylindrical core body has a first axial section having a first diameter, and a second axial section having a second diameter, wherein in use the consumable ribbon overlaps the first axial section and the second axial section. The second axial section is configured so that the second diameter can automatically change relative to the first diameter as the consumable ribbon is wound onto or unwound from the substantially cylindrical core body during operation of the card processing system.

In addition, a ribbon take-up core of a card processing system includes the first and second differently shaped axial sections, or the second section with automatically changing diameter described herein, that are overlapped by used ribbon having uneven material resulting from a build-up thereon or removal of material therefrom during use of the ribbon in the card processing system.

In addition, a ribbon supply core of a card processing system includes the first and second differently shaped axial sections, or the second section with automatically changing diameter described herein, that are overlapped by fresh or unused ribbon having uneven material thereon.

In addition, a card processing system can include a card input, a card output, and a card processing mechanism between the card input and the card output. The card processing mechanism includes a ribbon take-up core and/or a ribbon supply core that includes the first and second differently shaped axial sections, or the second section with automatically changing diameter described herein, that are overlapped by consumable ribbon which is either used ribbon having uneven material thereon resulting from a build-up of material thereon or removal of material therefrom during use of the ribbon in the card processing mechanism or fresh/unused ribbon having uneven material thereon.

DRAWINGS

DETAILED DESCRIPTION

Figure 11:
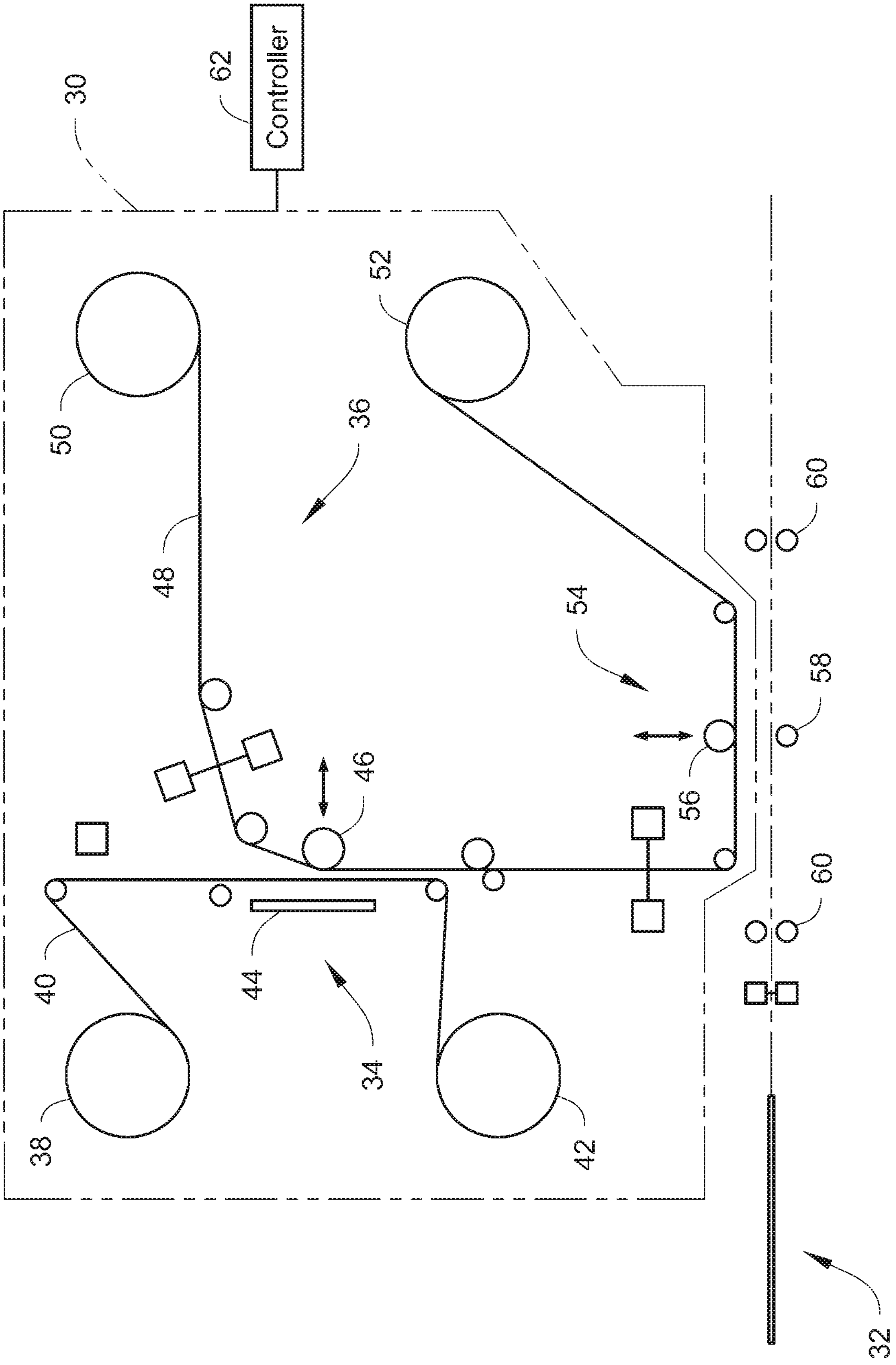
FIG. 11 illustrates a retransfer print station that can use the ribbon cores described herein.

Referring to FIG. 11, an example of an identification document processing mechanism of an identification document processing system that can use one or more of the ribbon cores described herein is illustrated. In this example, the identification document processing mechanism is depicted as a retransfer print station 30 that performs retransfer printing on an identification document such as a card 32. In retransfer printing, instead of printing directly on the card 32, the printing is initially performed on a transferrable print receptive material of a retransfer film which is then transferred to the card 32. Retransfer printing and the general construction of retransfer document print stations is well known in the art. However, the ribbon cores described herein can be used with other identification document processing mechanisms of identification document processing systems including, but not limited to, other forms of printing mechanisms such as with direct-to-card printing mechanisms.

Personalized identification documents described herein include personalized identification cards (or just personalized cards or plastic cards) and pages of passports. Personalized identification cards described herein include, but are not limited to, financial (e.g., credit, debit, or the like) cards, access cards, driver's licenses, national identification cards, and business identification cards, and other identification cards. In an embodiment, the identification cards may be ID-1 cards as defined by ISO/IEC 7810. However, other card formats such as ID-2 as defined by ISO/IEC 7810 are possible as well. The passport pages can be a front cover or a rear cover of the passport, or an internal page (for example a plastic page referred to as a data page) of the passport. In an embodiment, the passports may be in an ID-3 format as defined by ISO/IEC 7810.

For sake of convenience in describing the concepts herein, the following description and the drawings describe the identification document as being an identification card. However, as indicated above, the techniques described herein are applicable to pages of passports.

The term "identification document" or "identification card" as used throughout the specification and claims, unless indicated otherwise, refers to identification documents such as plastic cards where the document substrate can be formed substantially entirely of plastic, formed of a combination of plastic and non-plastic materials, or formed primarily of a biodegradable material such as one or more biodegradable plastics, paper/cardboard, or other biodegradable material(s). In one embodiment, the cards can be sized to comply with ISO/IEC 7810 with dimensions of about 85.60 by about 53.98 millimeters (about 3⅜ in × about 2⅛ in) and rounded corners with a radius of about 2.88-3.48 mm (about ⅛ in). As would be understood by a person of ordinary skill in the art of identification cards, the cards are typically formed of multiple individual layers that form the majority of the card body or the card substrate. Similarly, the term "plastic page" of a passport refers to passport pages where the passport can be formed entirely of plastic, or formed of a combination of plastic and non-plastic materials, or formed of biodegradable material(S). An example of a plastic passport page is the data page in a passport containing the personal data of the intended passport holder. The passport page may be a single layer or composed of multiple layers. Examples of plastic materials that the card or passport page, or the individual layers of the card or passport can be formed from include, but are not limited to, polycarbonate, polyvinyl chloride (PVC), polyester, acrylonitrile butadiene styrene (ABS), polyethylene terephthalate glycol (PETG), TESLIN®, combinations thereof, and other plastics.

Returning to FIG. 11, the retransfer print station 30 includes a print side 34 and a retransfer side 36. The print side 34 includes a print ribbon supply 38, a thermal transfer print ribbon 40, a print ribbon take-up 42, a thermal print head 44, and a platen 46. The ribbon supply 38 supplies the thermal transfer print ribbon 40, and the ribbon take-up 42 takes-up used portions of the thermal transfer print ribbon 40 after printing. The print ribbon 40 is transferred along a ribbon path between the ribbon supply 38 and the ribbon take-up 42 past the thermal print head 44 that can be moved toward and away from the opposing platen 46, which may be fixed, to sandwich the print ribbon 40 and the retransfer film therebetween during printing on the retransfer film. Alternatively, the platen 46 can be movable toward and away from the print head 44 which can be stationary. The print ribbon 40 can have a construction similar to the print ribbon 18 described in FIG. 2, with a repeating sequence of panels with each sequence of panels including a C color panel 20*a*, an M color panel 20*b*, a Y color panel 20*c*, one or more K color panels 20*d*, and one or more peel-off panels 20*e* of adhesive material. Each sequence of panels can optionally include a panel of inhibitor material and possibly other panels known in the art.

The retransfer side 36 includes a retransfer film 48 that is supplied from a retransfer film supply 50 and used retransfer film is wound up on a retransfer film take-up 52. The retransfer film 48 follows a path past the print head 44 where printing takes place on the transferrable print receptive material of the retransfer film 48. The retransfer film 48 with the printing thereon is then advanced to a transfer station 54 where the transferrable print receptive material with the printing thereon is transferred from the retransfer film 48 and laminated onto the card 32 using a heated transfer roller 56 and a platen 58. After transferring the transferrable material with the printing, the used retransfer film 48 is wound onto the take-up 52. The card 32 can be transported within the print station 30 using transport rollers 60.

The print station 30 further includes a controller 62 that controls operation of the print station 30. The controller 62 can be dedicated to the retransfer print station 30 so that it controls only the retransfer print station 30, or the controller 62 can be a controller for a larger system that includes the retransfer print station 30 with the controller 62 controlling one or more other systems in addition to the retransfer print station 30. In an embodiment, the controller 62 can be a central processing unit that executes computer program instructions to perform the operations of the retransfer print station 30 described herein.

Figure 12A:
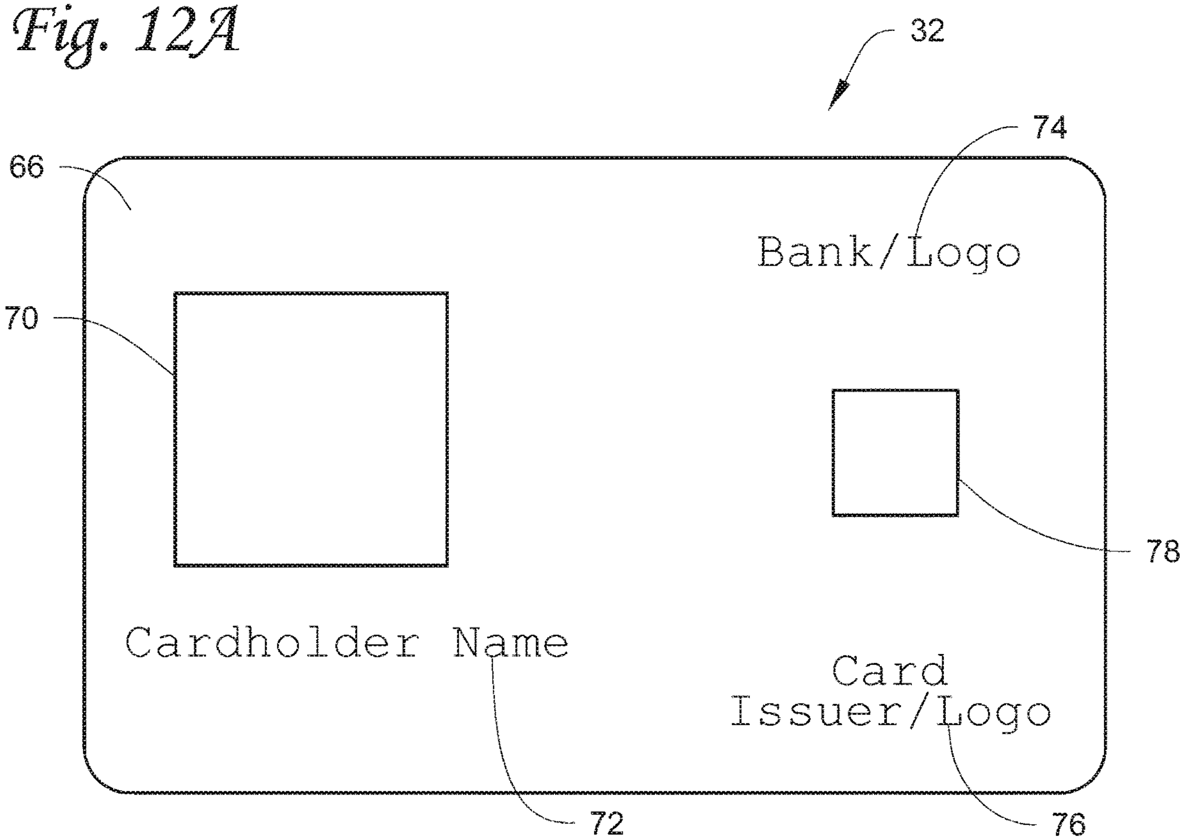
FIGS. 12A and 12B are views of examples of a front surface and a rear surface, respectively, of a personalized document in the form of an identification card.
Figure 12B:
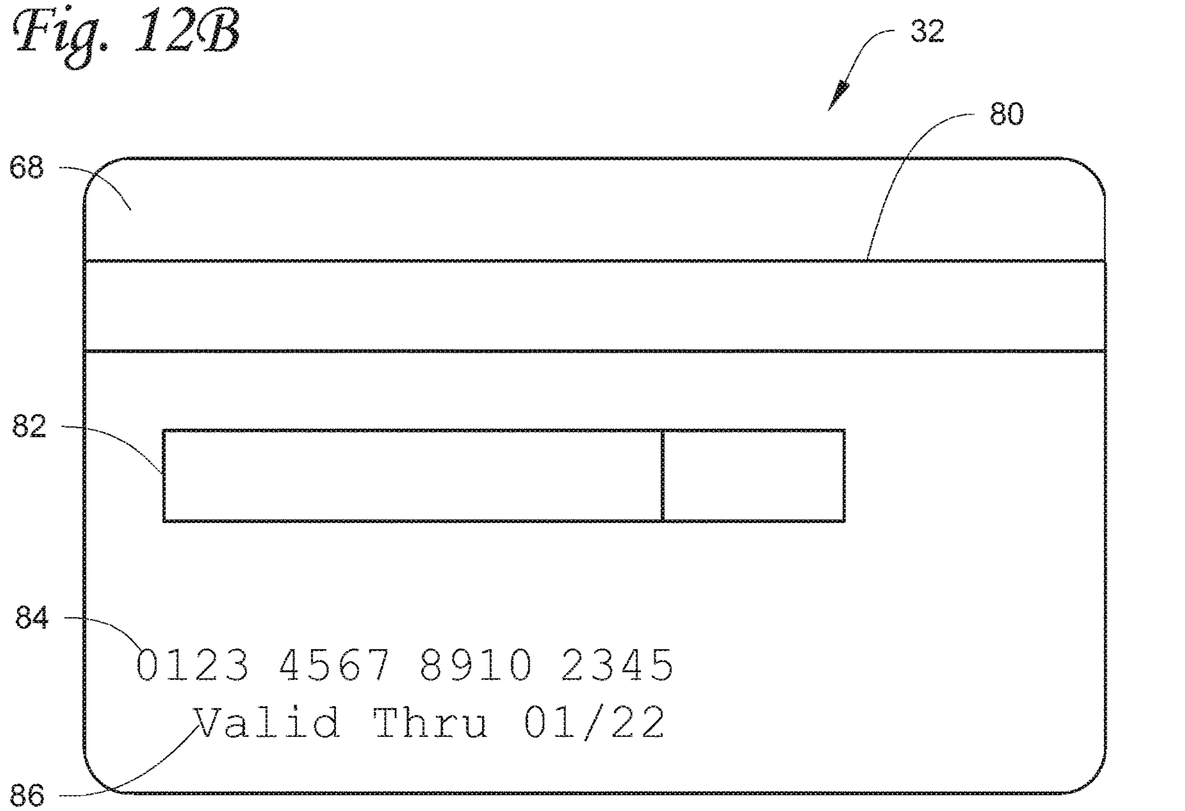

FIGS. 12A and 12B illustrate an example of the card 32. In this example, the card 32 is shown to include a front or first surface 66 (FIG. 12A) and a rear, back or second surface 68 (FIG. 12B) opposite the front surface 66. The card 32 may be printed on one side only (referred to as simplex printing), for example on the front surface 66 or the rear surface 68, or printed on both sides (referred to as duplex printing), for example on each of the front surface 66 and the rear surface 68.

Many possible layouts for the front surface 66 are possible. For example, the front surface 66 can include a horizontal card layout, a vertical card layout, and other known layout configurations and orientations. In the illustrated example in FIG. 12A, the front surface 66 can include various printed cardholder data such as a printed portrait image 70, the cardholder name 72, and account information such as account number, expiration date and the like. The front surface 66 can also include other printed data such as printed information 74 of the entity that issued the card 32, such as the corporate name and/or logo of the issuing bank (for example, STATE BANK), and/or printed information 76 of the card brand name (for example, VISA®, MASTERCARD®, DISCOVER®, etc.). The front surface 66 may also include a contact or contactless integrated circuit chip 78 that can store various data relating to the card 32 such as an account number and/or name of the cardholder.

Referring to FIG. 12B, many possible layouts for the rear surface 68 are possible which may or may not have a similar layout as the front surface 66. For example, the rear surface 68 can include a horizontal card layout, a vertical card layout, and other known layout configurations and orientations. In the illustrated example in FIG. 12B, the rear surface 68 can include a magnetic strip 80 that stores various data relating to the card 32 such as an account number or name of the cardholder, a signature panel 82 that provides a place for the cardholder to sign their name, and a hologram. The magnetic strip 80, the signature panel 82, and the hologram are conventional elements found on many cards such as identification cards, financial cards like credit cards and the like. The rear surface 68 can also include printed personal data that is unique to or assigned specifically to the cardholder. For example, an account number 84 assigned to the cardholder, the name of the cardholder, and a card expiration date 86 can be printed on the rear surface 68. Other personal cardholder data may also be printed on the rear surface 68, such as an image of the face of the cardholder. Non-personal data such as the name of the issuing bank, contact information to contact the issuing bank, and the like, can also be printed on the rear surface 68.

On the card 32, the integrated circuit chip 78, the magnetic strip 80, and the signature panel 82 are examples of areas on the surfaces of the card 32 that one may decide should not be covered with the transferrable print receptive material of the retransfer film 48 (FIG. 11) since the print receptive material may interfere with the operation of the chip 78, the magnetic strip 80 and the signature panel 82. To prevent covering of any one or more of these areas on the card, the transferrable print receptive material (and possibly a protective material) are peeled-off of the retransfer film 48 at the location(s) corresponding to the area(s) of the card 32 not to be covered prior to transferring the printed image to the card 32.

Figure 1A:
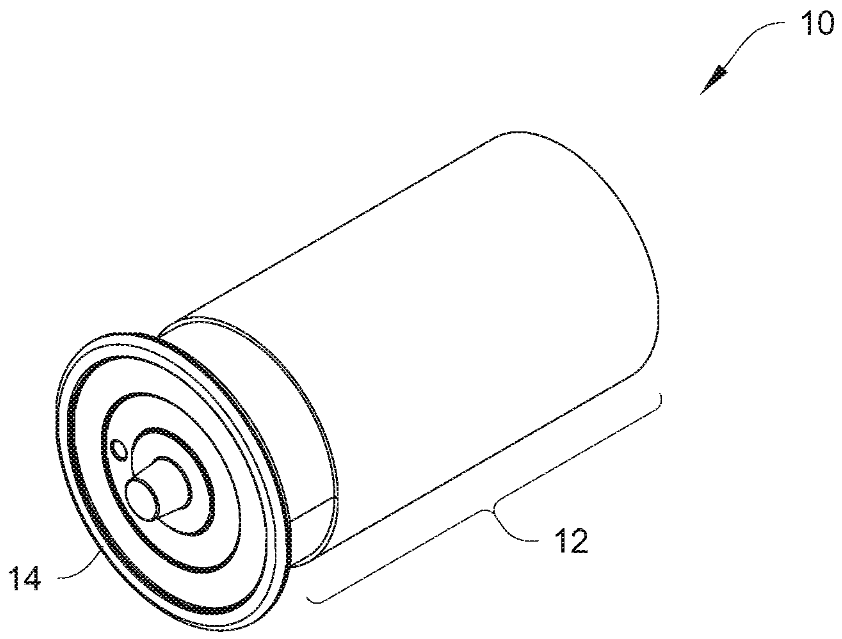
Fig. 1A Prior Art
FIGS. 1A and 1B depict a conventional ribbon core.
Figure 1B:
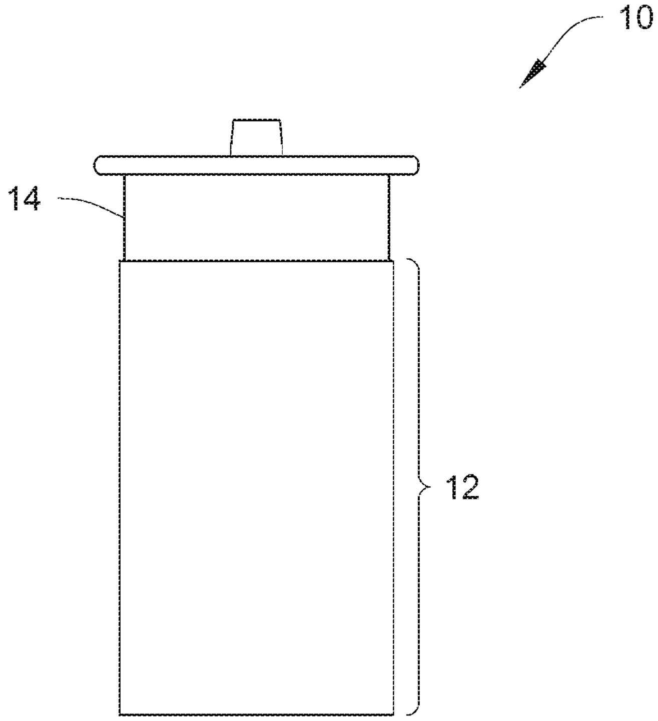
Fig. 1B Prior Art
Figure 1C:
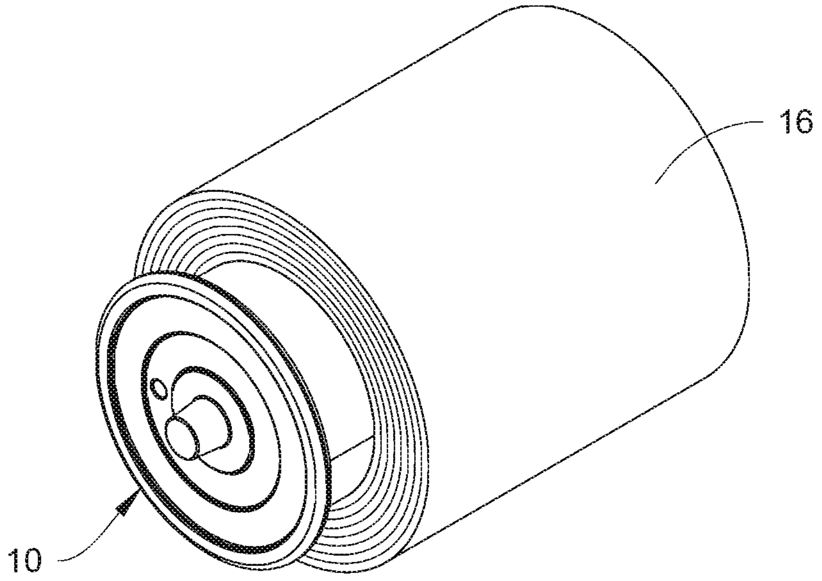
Fig. 1C Prior Art
FIG. 1C depicts a conventional ribbon without built-up material wound onto a conventional ribbon core.
Figure 2:
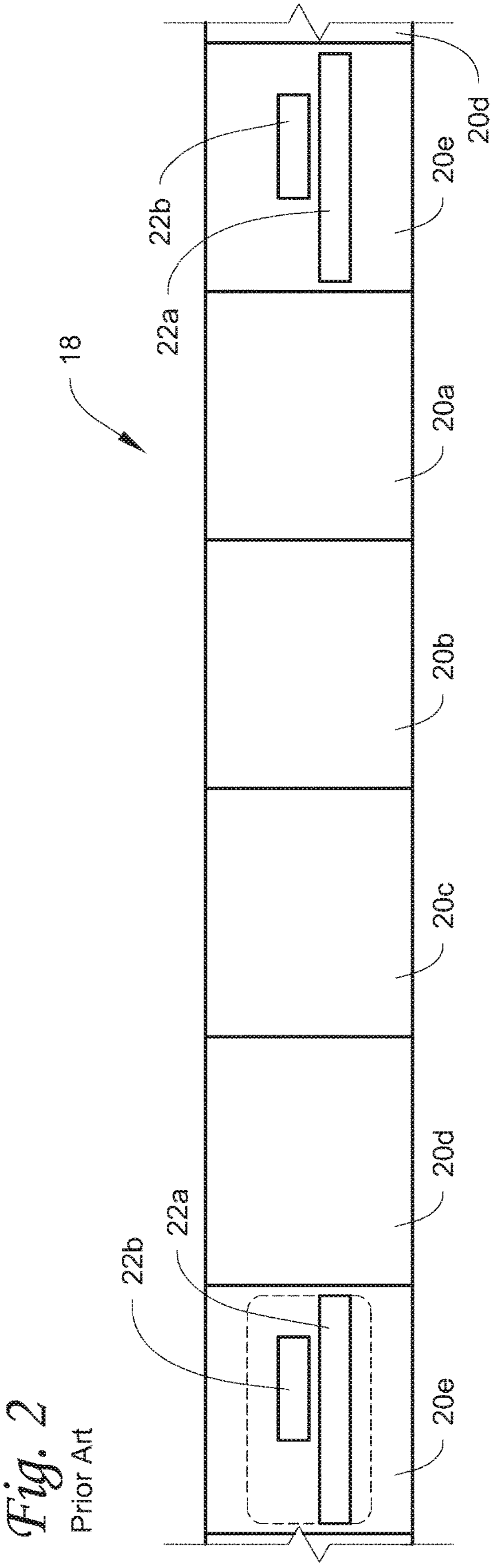
Fig. 2 Prior Art
FIG. 2 depicts a known print ribbon having transferrable material from a retransfer film on peel-off panels of the print ribbon.

As described above with respect to FIG. 2, the peel-off process is used to remove print receptive material from the retransfer film 48 corresponding to one or more areas on the card surface that is not to be covered by the print receptive material. For example, as described in FIG. 2, a peel-off process using one of the peel-off panels 20*e* of the print ribbon 40 is used to remove print receptive material from the retransfer film 48 corresponding in location to an area(s) on the card surface that is not to be covered by the print receptive material. The removed print receptive material remains on the peel-off panel as depicted in FIG. 2. In the case of printing on the rear surface 68, the removed print receptive material can correspond to the location of the magnetic strip 80, the signature panel 82, or both, or any other location(s) on the rear surface 68. In the case of printing on the front surface 66, the removed print receptive material can correspond to the location of the chip 78 or any other location on the front surface 66. However, as described with respect to FIGS. 2 and 3, the build-up of material on the peel-off panels of the print ribbon 40 can create problems when winding the print ribbon 40 onto a conventional ribbon core.

Figure 3:
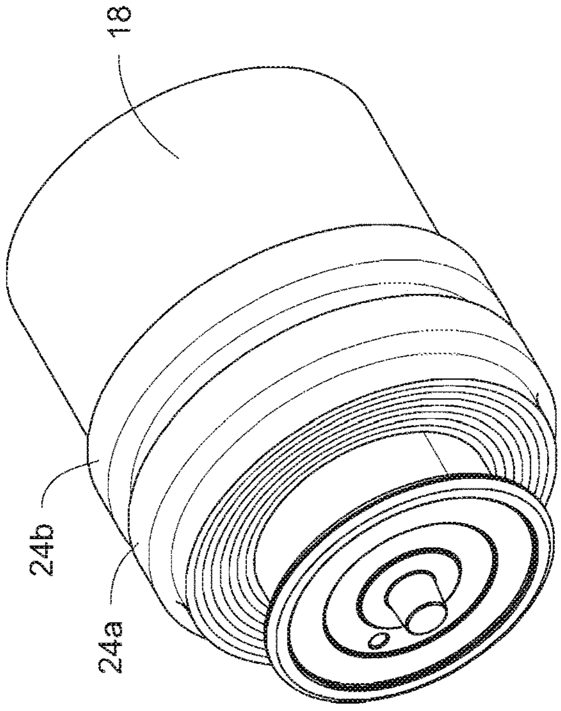
Fig. 3 Prior Art
FIG. 3 depicts the print ribbon of FIG. 2 wound onto a conventional ribbon core.
Figure 4A:
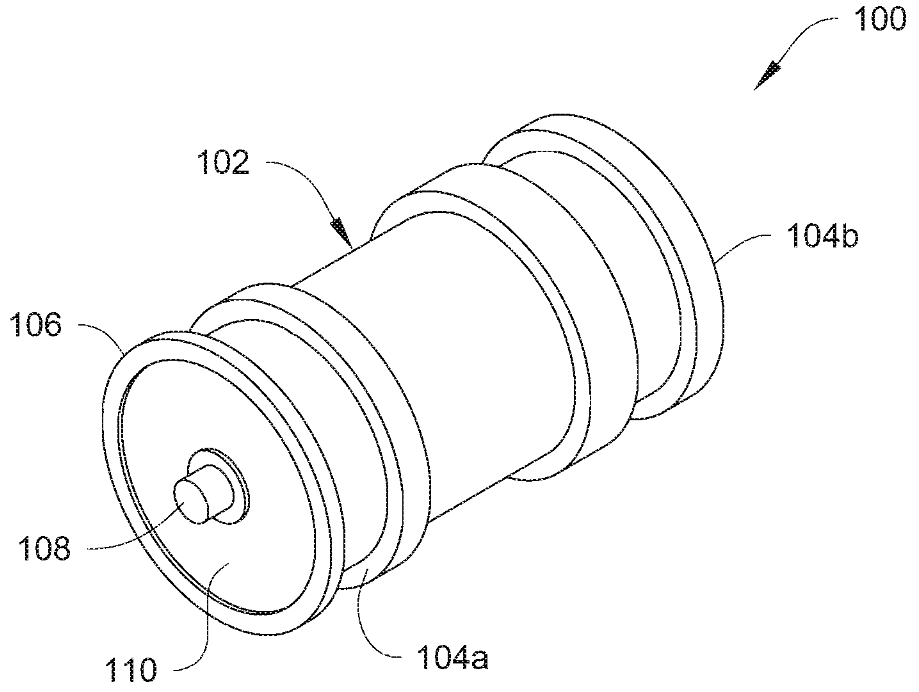
FIGS. 4A and 4B are perspective and side views, respectively, of a ribbon core described herein that is configured to accommodate uneven material on a ribbon that is ultimately wound onto the ribbon core.
Figure 4B:
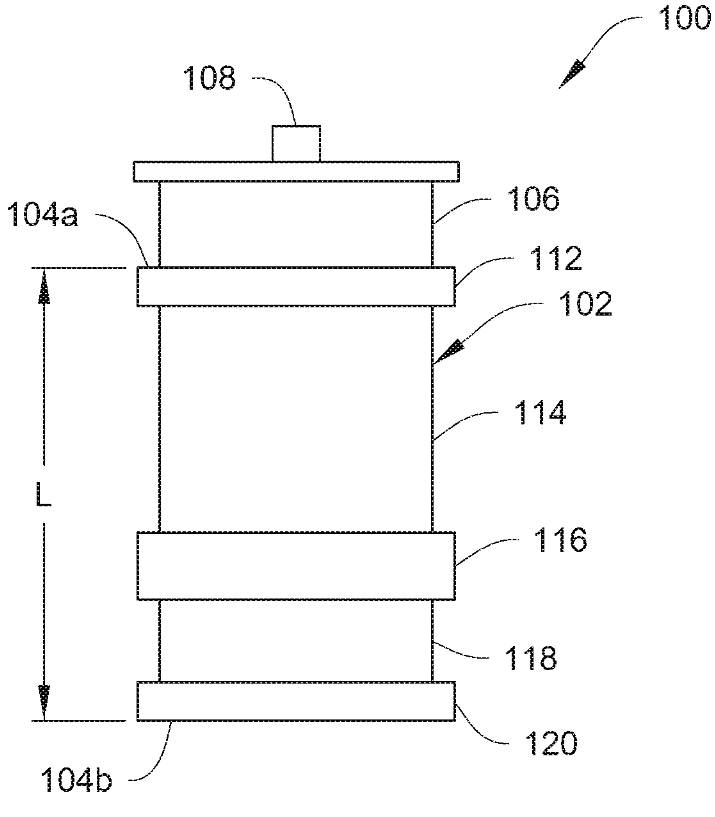

FIGS. 4A and 4B illustrate a first example of a ribbon core 100 that is configured to accommodate uneven material on a consumable ribbon, such as a print ribbon. The uneven material on the consumable ribbon can be the result of a build-up of material on the ribbon, for example as described above with respect the peel-off process. The uneven material on the consumable ribbon can also be the result of removal of material from the ribbon, such as during a printing operation applying ink or a topcoat, or applying an overlay material or patch, which creates one or more depressions in the ribbon (instead of a ridge as depicted in FIG. 3) when wound onto a take-up core, with the depression occurring in the area of the ribbon where the material has been removed from the ribbon. For sake of convenience, the uneven material will be described as a build-up of material on the ribbon. However, the concepts described herein also apply to uneven material in the form of removal of material from the ribbon which creates a depression in the wound ribbon.

The ribbon core 100 can be a take-up core that takes up used consumable ribbon or a supply core that contains fresh/unused consumable ribbon. The ribbon core 100 includes a core body 102 around which the consumable ribbon (not shown) is wound. The core body 102 has a first axial end 104*a* and a second axial end 104*b*. A cap 106 is secured to the first axial end 104*a* which closes the first axial end 104*a* and provides a support pin 108 for rotatably supporting the ribbon core 100 during use. The cap 106 also includes a flat surface 110 on which a donut-shaped radio frequency identification tag (not shown) can be mounted.

The ribbon is wound onto the core body 102 over the axial length L of the core body 102. In this example, the core body 102 is generally a cylinder, with axial sections along its length L that have different circumferential shapes, such as different diameters. In this embodiment, the core body 102 can be referred to as a stepped core body, and the core 100 can be referred to as a stepped core. For example, the core body 102 has a first axial section 112 that is overlapped by a first section (first width) of the ribbon and having a first circumferential shape, and a second axial section 114 that is overlapped by a second section (second width) of the consumable ribbon and having a second circumferential shape that differs from the first circumferential shape of the first axial section 112. FIGS. 4A-B also illustrate the core body 102 as having a third axial section 116 that is overlapped by a third section of the ribbon and having a third circumferential shape that differs from the second circumferential shape of the second axial section 114 but which has the same circumferential shape as the first axial section 112. The core body 102 further includes a fourth axial section 118 that is overlapped by a fourth section of the ribbon and having a fourth circumferential shape that is the same as the circumferential shape of the second axial section 114 but which differs from the circumferential shape of the first axial section 112 and the third axial section 116. The core body 102 further a fifth axial section 120 that is overlapped by a fifth section of the ribbon and having a fifth circumferential shape that is the same as the circumferential shapes of the first and third axial sections 112, 116 but which differs from the circumferential shapes of the second and fourth axial sections 114, 118.

In the illustrated example, the first, third and fifth axial sections 112, 116, 120 are substantially cylindrical with the same diameters. The second and fourth axial sections 114, 118 are also substantially cylindrical with the same diameter that is less than the diameter of the first, third and fifth axial sections 112, 116, 120. The second and fourth axial sections 114, 118 are positioned on the core body 102 at locations where a build-up of material on the ribbon to be wound onto the ribbon core 100 is located. Because the second and fourth axial sections 114, 118 have a diameter that is less than the diameter of the first, third and fifth axial sections 112, 116, 120, the second and fourth axial sections 114, 118 accommodate the material build-up and prevent formation of the ridges shown in FIG. 3.

In FIGS. 4A-B, the first axial section 112 is depicted as being at the first axial end 104*a*. The second axial section 114 is between the first axial section 112 and the second axial end 104*b*, in particular between the first axial section 112 and the third axial section 116. The third axial section 116 is between the second axial section 114 and the fourth axial section 118, and the fourth axial section 118 is between the third axial section 116 and the fifth axial section 120. The fifth axial section 120 is depicted as being at the second axial end 104*b* of the core body 102. The second axial section 114 is shown as having an axial length that is greater than all of the other axial sections 112, 116, 118, 120. The axial length of the third axial section 116 is greater than the axial length of the first axial section 112 and the fifth axial section 120.

Ribbon is wound around the ribbon core 100. However, the reduced diameter portion(s) is located on the core 100 at a location to reduce or eliminate build-up of ridges like depicted in FIG. 3.

Other constructions of the core body 102 are possible. Only one of the reduced diameter axial sections 114, 118 may be required depending upon where a build-up of material is located on the width of the ribbon. For example, if material build-up occurs on the ribbon at a location so that only the axial section 114 is required, the axial section 118 need not be present in which case the axial sections 116, 120 can be combined into a single continuous axial section. In addition, the axial sections 114, 118 could have different diameters from one another, each of which is less than the diameters of the axial sections 112, 116, 120, or the axial section 114 could have two or more reduced diameter sections each of which is less than the diameters of the axial sections 112, 116, 120, or the axial section 114 could have a sloped/tapered circumference that slopes or tapers in a direction from the first axial section 112 toward the third axial section 116 (or vice versa). The diameters of the axial sections 112, 116, 120 can be different from one another. The different axial sections 112, 114, 116, 118, 120 can be substantially cylindrical or they can be irregular surfaces. A radiused transition can also be provided in the transition from one axial section to another axial section, and the radiused transitions may be the same radius or some may be different radiuses than the others. The transition(s) between a larger diameter axial section and a smaller diameter axial section may also be formed by crenellated structures formed on the larger diameter axial section and that extend toward the smaller diameter axial section. In addition, one of the larger diameter axial sections can effectively be formed from multiple high and low axial sub-sections that create the larger diameter axial sections with an irregular surface.

Figure 5A:
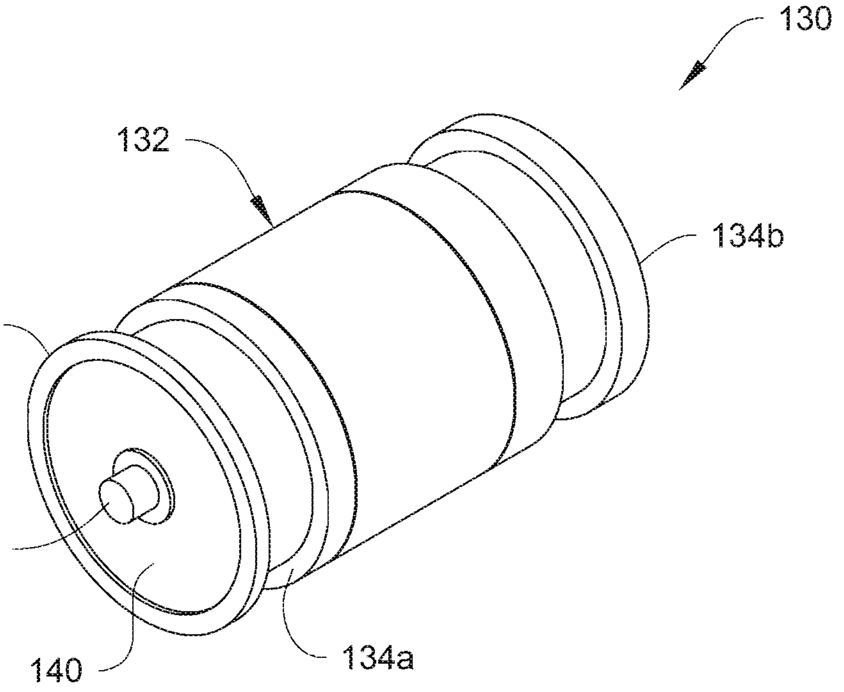
FIGS. 5A and 5B are perspective and side views, respectively, of another embodiment of a ribbon core described herein that is configured to accommodate uneven material on a ribbon that is ultimately wound onto the ribbon core.
Figure 5B:
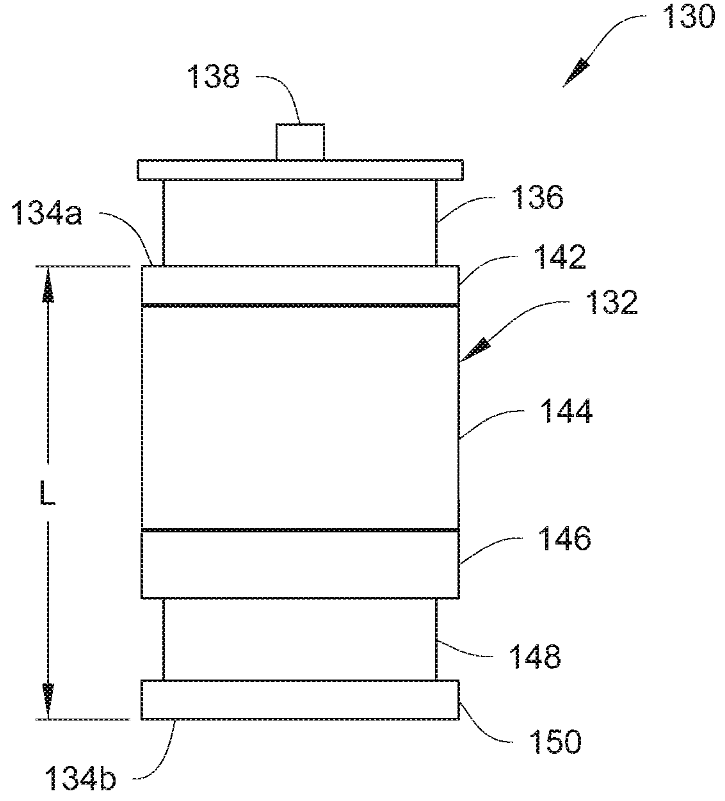

FIGS. 5A and 5B illustrate another example of a ribbon core 130 that is configured to accommodate build-up of material on a consumable ribbon, such as a print ribbon. The ribbon core 130 can be a take-up core that takes up used consumable ribbon or a supply core that contains fresh/unused consumable ribbon. The ribbon core 130 includes a core body 132 around which the consumable ribbon (not shown) is wound. The core body 132 has a first axial end 134*a* and a second axial end 134*b*. A cap 136 is secured to the first axial end 134*a* which closes the first axial end 134*a* and provides a support pin 138 for rotatably supporting the ribbon core 130 during use. The cap 136 also includes a flat surface 140 on which a donut-shaped radio frequency identification tag (not shown) can be mounted.

The ribbon is wound onto the core body 132 over the axial length L of the core body 132. In this example, the core body 132 is generally a cylinder, with axial sections along its length L at least one of which can automatically change in circumferential shape during use, as well have different circumferential shapes similar to FIGS. 4A-B. For example, the core body 132 has a first axial section 142 that is overlapped by a first section of the ribbon and having a first circumferential shape, and a second axial section 144 that is overlapped by a second section of the consumable ribbon. The second axial section 144 is located at a position where a build-up of material occurs on the ribbon. In this example, the first axial section 142 has a fixed/constant diameter, while the second axial section 144 is initially substantially cylindrical but is configured to automatically reduce in diameter when the ribbon is wound thereon. For example, the second axial section 144 can be formed of a sleeve or hollow cylinder of resilient material, such as foam or rubber, that automatically collapses under the pressure of the built-up material on the section of the ribbon that is wound on and overlaps the second axial section 144. As depicted in FIGS. 5A-B, the second axial section 144 can initially have a diameter that is substantially equal to the diameter of the first axial section 142 before any ribbon is wound onto the core body 132. However, the diameter of the second axial section 144 can be initially greater than or initially less than the diameter of the first axial section 142 before winding any ribbon onto the core body 132.

FIGS. 5A-B also illustrate the core body 132 as having a third axial section 146 that is overlapped by a third section of the ribbon and having a third, fixed circumferential shape that is the same as the first axial section 142. The core body 132 further includes a fourth axial section 148 that is overlapped by a fourth section of the ribbon and having a circumferential shape, such as a reduced diameter, that is similar to the axial section 118 in FIGS. 4A-B. The core body 132 further includes a fifth axial section 150 that is overlapped by a fifth section of the ribbon and having a circumferential shape that is the same as the circumferential shapes of the first and third axial sections 142, 146 but which differs from the circumferential shape of the fourth axial section 148.

In the embodiment of FIGS. 5A-B, the core body 132 can have a construction that is similar to the construction of the stepped core body 102 in FIGS. 4A-B, with the sleeve or hollow cylinder of resilient material of the second axial section 144 located around the stepped second axial section 114 in FIGS. 4A-B.

Figure 6A:
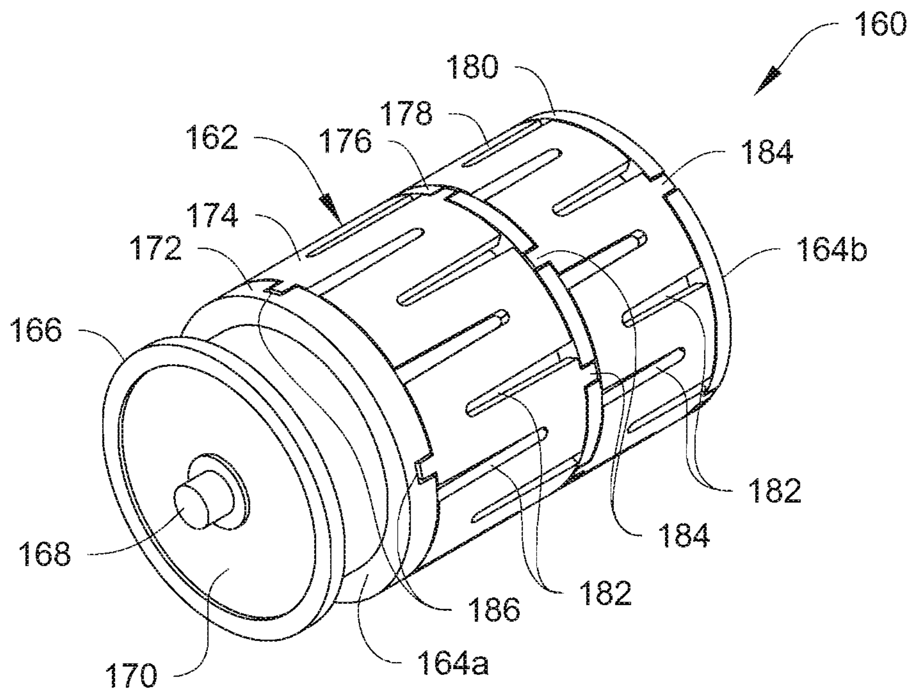
FIGS. 6A, 6B and 6C are perspective, side, and cross-sectional (along line 6C-6C) views, respectively, of another embodiment of a ribbon core described herein that is configured to accommodate uneven material on a ribbon that is ultimately wound onto the ribbon core.
Figure 6B:
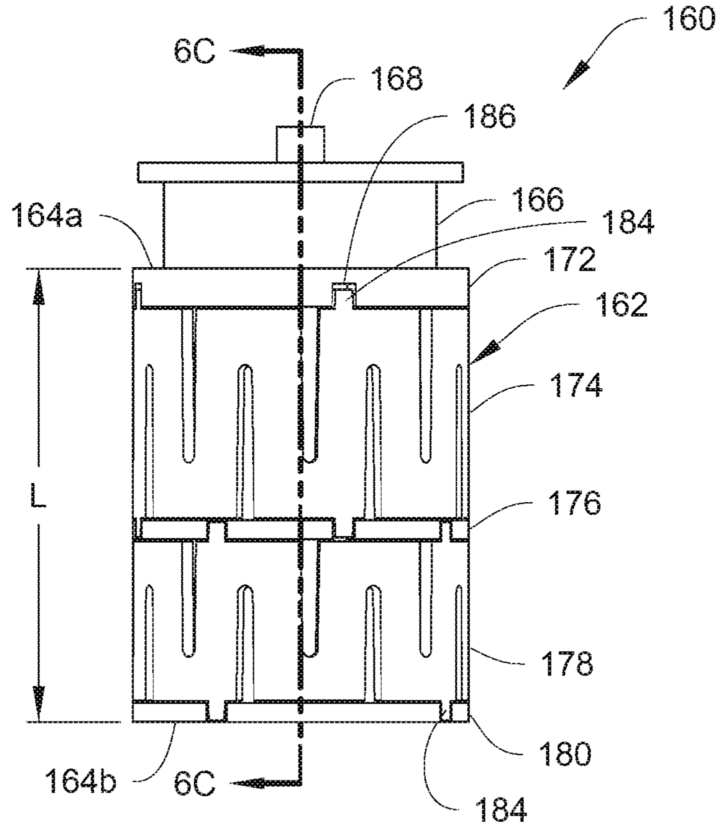
Figure 6C:
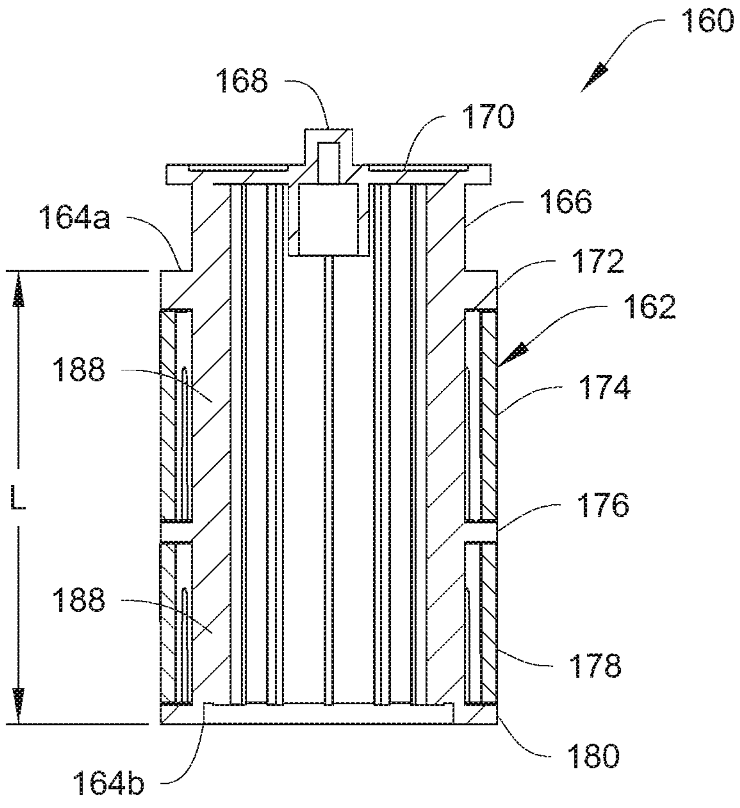

FIGS. 6A-C illustrate another example of a ribbon core 160 that is configured to accommodate build-up of material on a consumable ribbon, such as a print ribbon. The ribbon core 160 can be a take-up core that takes up used consumable ribbon or a supply core that contains fresh/unused consumable ribbon. The ribbon core 160 includes a core body 162 around which the consumable ribbon (not shown) is wound. The core body 162 has a first axial end 164*a* and a second axial end 164*b*. A cap 166 is secured to the first axial end 164*a* which closes the first axial end 164*a* and provides a support pin 168 for rotatably supporting the ribbon core 160 during use. The cap 166 also includes a flat surface 170 on which a donut-shaped radio frequency identification tag (not shown) can be mounted.

The ribbon is wound onto the core body 162 over the axial length L of the core body 162. In this example, the core body 162 is generally a cylinder, with axial sections along its length L at least one of which can automatically change in circumferential shape during use. In this embodiment, the core body 162 is provided with one or more expanding/collapsing collet sleeves that can automatically collapse under pressure from built up material on the ribbon wound around the collet sleeve(s). For example, the core body 162 has a first axial section 172 that is overlapped by a first section of the ribbon and having a first circumferential shape, and a second axial section 174, formed by an expanding/collapsing collet sleeve, that is overlapped by a second section of the consumable ribbon. The second axial section 174 is located at a position where a build-up of material occurs on the ribbon. In this example, the first axial section 172 has a fixed/constant diameter, while the second axial section 174 is initially substantially cylindrical but is configured to automatically reduce in diameter when the ribbon is wound thereon. The core body 162 also includes a third axial section 176 that is overlapped by a third section of ribbon and having a fixed/constant diameter, a fourth axial section 178, also formed by an expanding/collapsing collet sleeve, that is overlapped by a fourth section of the consumable ribbon, and a fifth axial section 180 having a fixed/constant diameter.

The collet sleeves of the second axial section 174 and the fourth axial section 178 are formed with a plurality of alternating slits or slots 182 that extend around the circumference of the collet sleeves, and that extend axially from alternating ends of the collet sleeves. The slots 182 allow the collet sleeves to automatically collapse in diameter under the pressure of the built-up material on the sections of the ribbon that are wound on and overlap the second axial section 174 and the fourth axial section 178. The collet sleeves can have a construction like the collet sleeve depicted in FIG. 10. The collet sleeves can be formed of any material, such as plastic or a metal, that allow automatic collapsing of the diameters of the collet sleeves. The outer diameter of the collet sleeve, the width of the slots 182, the thickness of the collet sleeve, and the material properties of the collet sleeve all dictate the spring rate and compressibility. As depicted in FIGS. 6A-C, the second axial section 174 and the fourth axial section 178 can initially have a diameter that is substantially equal to the diameter of the first axial section 172 before any ribbon is wound onto the core body 162. However, the diameter of the second axial section 172 and the fourth axial section 178 can be initially greater than or initially less than the diameter of the first axial section 172 before winding any ribbon onto the core body 162.

FIGS. 6A-C illustrate the core body 162 as having two collet sleeves. However, the core body 162 can include a single collet sleeve, for example on either the second axial section 174 or on the fourth axial section 178, or the core body 162 can include more than two collet sleeves. In addition, the two collet sleeves need not have the same initial diameter. The diameter of one of the collet sleeves can be initially larger than the initial diameter of the other collet sleeve. In addition, one of the collet sleeves can be configured to collapse more and/or at a different pressure than the other collet sleeve.

In addition, referring to FIGS. 6A-B, the ends of the collet sleeves include tabs 184 that axially project from the ends of the collet sleeves. The tabs 184 fit closely into receiving slots 186 of the first axial section 172, the third axial 176 and the fifth axial section 180. The tabs 184 hold the collet sleeve(s) in a position where the collet sleeve(s) is coaxial with the diameter of the larger diameter axial section(s). Without the tabs 184, the clearance between the collet sleeve(s) and the smaller diameter axial section(s) of the core body 162 around which the collet sleeve(s) is disposed will result in the collet sleeve(s) moving off center if it is not held in place. However, the tabs 184 allow the collet sleeve to collapse radially. The tabs 184 and slots 186 also help prevent rotation of the collet sleeves relative to the core body 162.

Figure 7A:
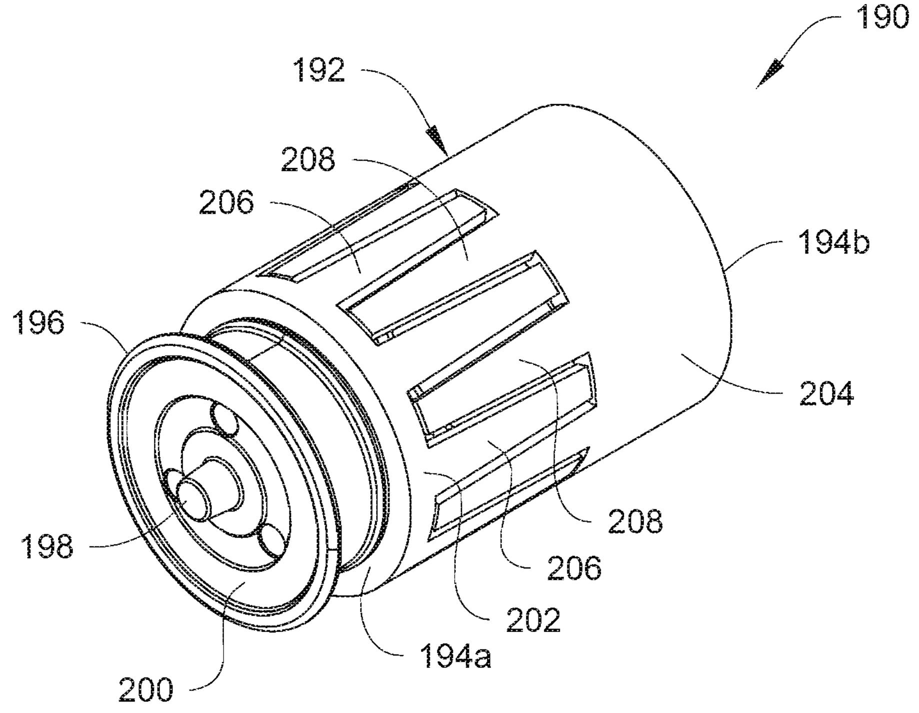
FIGS. 7A and 7B are perspective and side views, respectively, of another embodiment of a ribbon core described herein that is configured to accommodate uneven material on a ribbon that is ultimately wound onto the ribbon core.
Figure 7B:
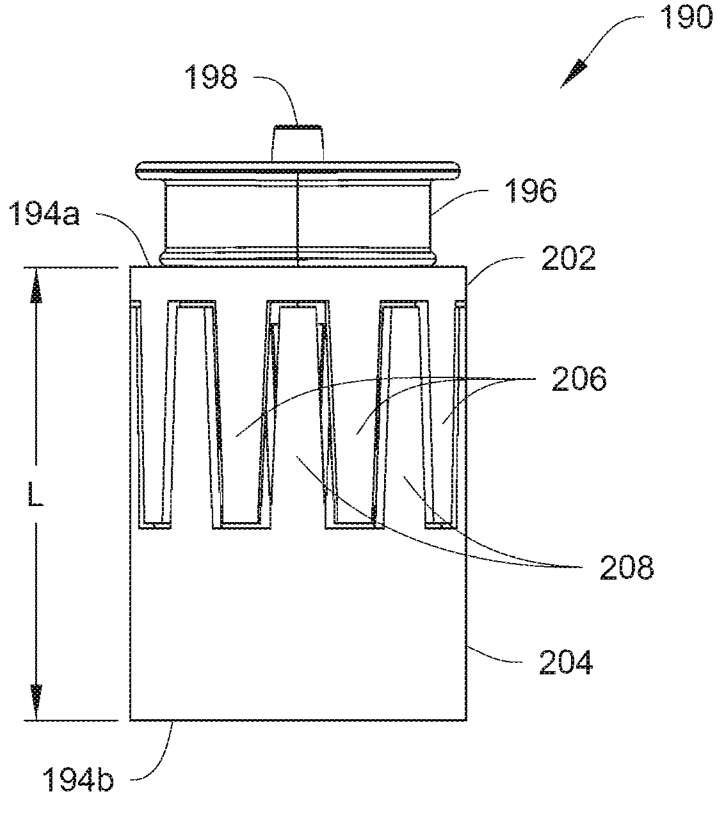

FIGS. 7A and 7B illustrate another example of a ribbon core 190 that is configured to accommodate build-up of material on a consumable ribbon, such as a print ribbon. The ribbon core 190 can be a take-up core that takes up used consumable ribbon or a supply core that contains fresh/unused consumable ribbon. The ribbon core 190 includes a core body 192 around which the consumable ribbon (not shown) is wound. The core body 192 has a first axial end 194*a* and a second axial end 194*b*. A cap 196 is secured to the first axial end 194*a* which closes the first axial end 194*a* and provides a support pin 198 for rotatably supporting the ribbon core 190 during use. The cap 196 also includes a flat surface 200 on which a donut-shaped radio frequency identification tag (not shown) can be mounted.

The ribbon is wound onto the core body 192 over the axial length L of the core body 192. In this example, the core body 192 is generally a cylinder, with axial sections along its length L at least one of which can automatically change in circumferential shape during use. For example, the core body 192 has a first axial section 202 that is overlapped by a first section of the ribbon and having a first circumferential shape, and a second axial section 204 that is overlapped by a second section of the consumable ribbon. The first axial section 202 has cantilevered fingers 206 that extend axially toward the second axial section 204, and the second axial section 204 has cantilevered fingers 208 that extend axially toward the first axial section 202. The cantilevered fingers 206 taper (i.e. decrease) in width as the fingers 206 extend toward the second axial section 204, and the cantilevered fingers 208 taper (i.e. decrease) in width as the fingers 208 extend toward the first axial section 202. The cantilevered fingers 206 are interleaved with the cantilevered fingers 208. In operation, each finger 206, 208 is a cantilever that can deflect progressively inward as layers of ribbon, with a build-up of material, accumulates thereon.

Figure 8A:
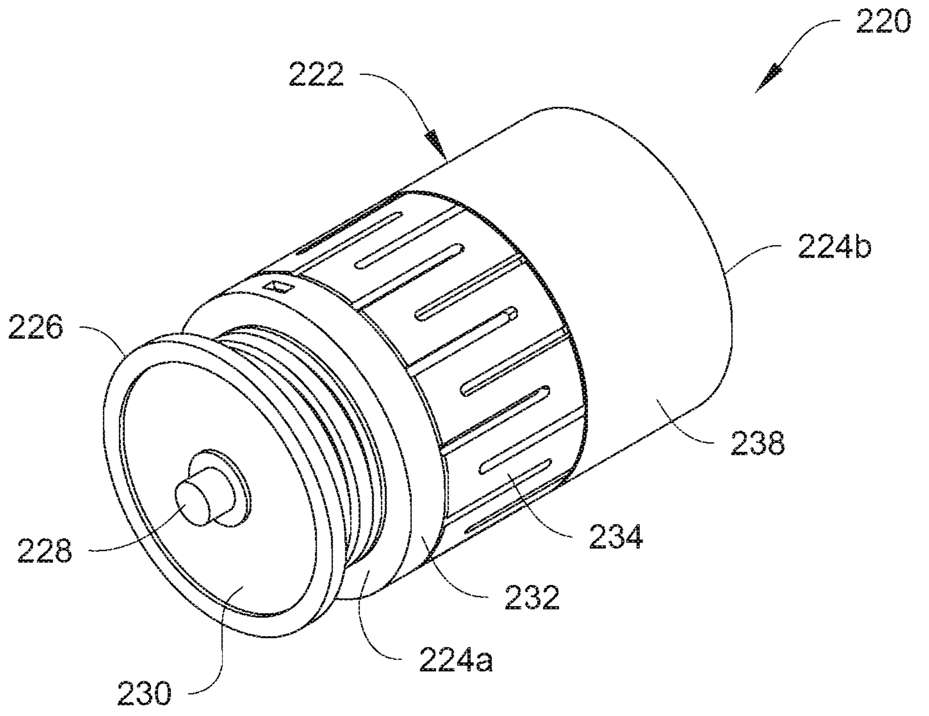
FIGS. 8A and 8B are perspective and side views, respectively, of another embodiment of a ribbon core described herein that is configured to accommodate uneven material on a ribbon that is ultimately wound onto the ribbon core.
Figure 8B:
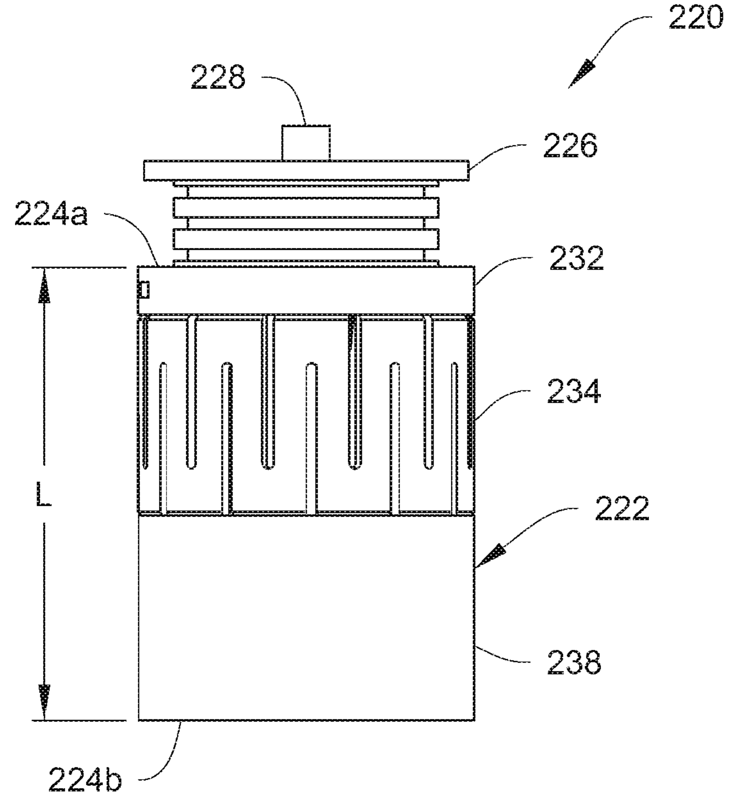

FIGS. 8A and 8B illustrate another example of a ribbon core 220 that is configured to accommodate build-up of material on a consumable ribbon, such as a print ribbon. The ribbon core 220 can be a take-up core that takes up used consumable ribbon or a supply core that contains fresh/unused consumable ribbon. The ribbon core 220 includes a core body 222 around which the consumable ribbon (not shown) is wound. The core body 222 has a first axial end 224*a* and a second axial end 224*b*. A cap 226 is secured to the first axial end 224*a* which closes the first axial end 224*a* and provides a support pin 228 for rotatably supporting the ribbon core 220 during use. The cap 226 also includes a flat surface 230 on which a donut-shaped radio frequency identification tag (not shown) can be mounted.

The ribbon is wound onto the core body 222 over the axial length L of the core body 222. In this example, the core body 222 is generally a cylinder, with axial sections along its length L at least one of which can automatically change in circumferential shape during use. In this embodiment, the core body 222 is provided with one or more expanding/collapsing collet sleeves that can automatically collapse under pressure from built up material on the ribbon wound around the collet sleeve(s). For example, the core body 222 has a first axial section 232 that is overlapped by a first section of the ribbon and having a first circumferential shape, and a second axial section 234, formed by an expanding/collapsing collet sleeve 236 (see FIG. 10), that is overlapped by a second section of the consumable ribbon. The second axial section 234 is located at a position where a build-up of material occurs on the ribbon. In this example, the first axial section 232 has a fixed/constant diameter, while the second axial section 234 is initially substantially cylindrical but is configured to automatically reduce in diameter when the ribbon is wound thereon. The core body 222 also includes a third axial section 238 that is overlapped by a third section of ribbon and having a fixed/constant diameter.

Figure 10:
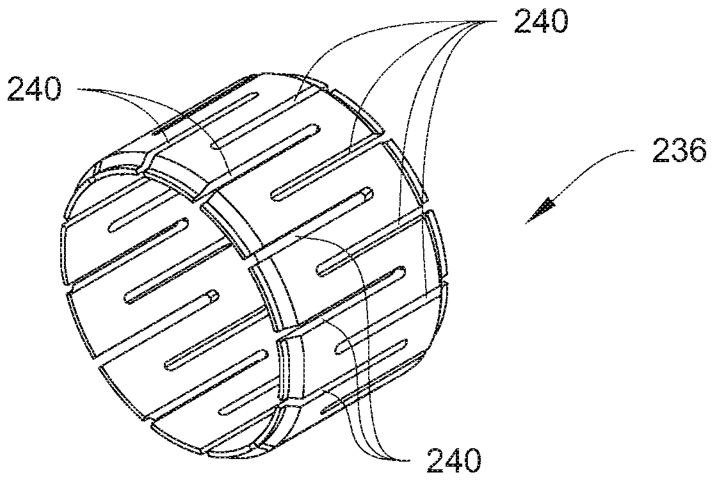
FIG. 10 is a perspective view of an expanding/collapsing collet sleeve that is useable with the embodiment in FIGS. 6A-C, 8A-B and 9A-B.

Referring to FIGS. 8A-B and 10, the collet sleeve 236 of the second axial section 234 is a cylindrical structure that is formed with a plurality of alternating slits or slots 240 that extend around the circumference of the collet sleeve 236, and that extend axially from alternating ends of the collet sleeve 236. The slots 240 allow the collet sleeve 236 to automatically collapse in diameter under the pressure of the built-up material on the section of the ribbon that is wound on and overlaps the second axial section 234. The collet sleeve 236 can be formed of any material, such as plastic or a metal, that allows automatic collapsing of the diameter of the collet sleeve 236. As depicted in FIGS. 8A-B, the second axial section 234 can have a diameter that is initially substantially equal to the diameter of the first axial section 232 and the third axial section 238 before any ribbon is wound onto the core body 222. However, the diameter of the second axial section 234 can be initially greater than or initially less than the diameter of the first axial section 232 and the third axial section 238 before winding any ribbon onto the core body 222.

Optionally, the ends of the collet sleeve 236 can include tabs that fit into slots, similar to the tabs 184 and slots 186 in FIGS. 6A-B.

Figure 9A:
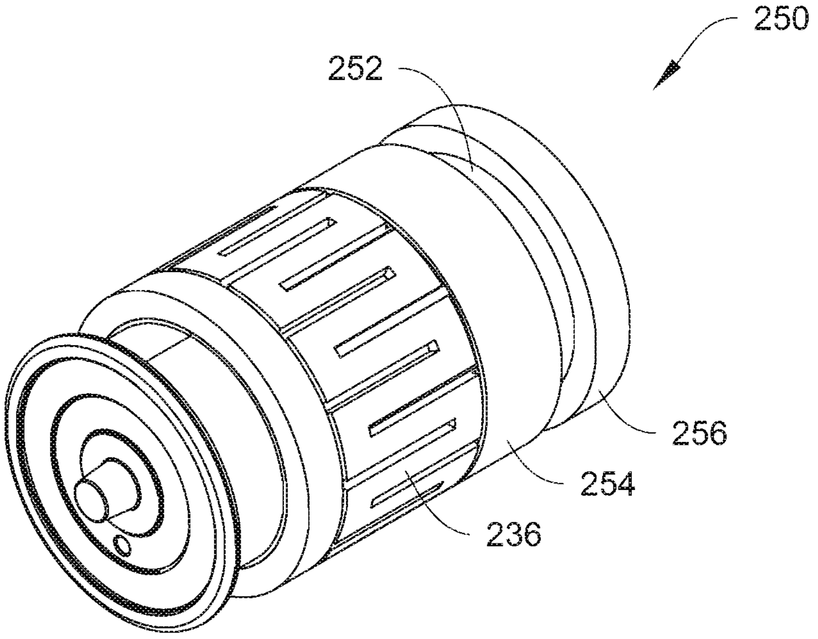
FIGS. 9A and 9B are perspective and side views, respectively, of another embodiment of a ribbon core described herein that is configured to accommodate uneven material on a ribbon that is ultimately wound onto the ribbon core.
Figure 9B:
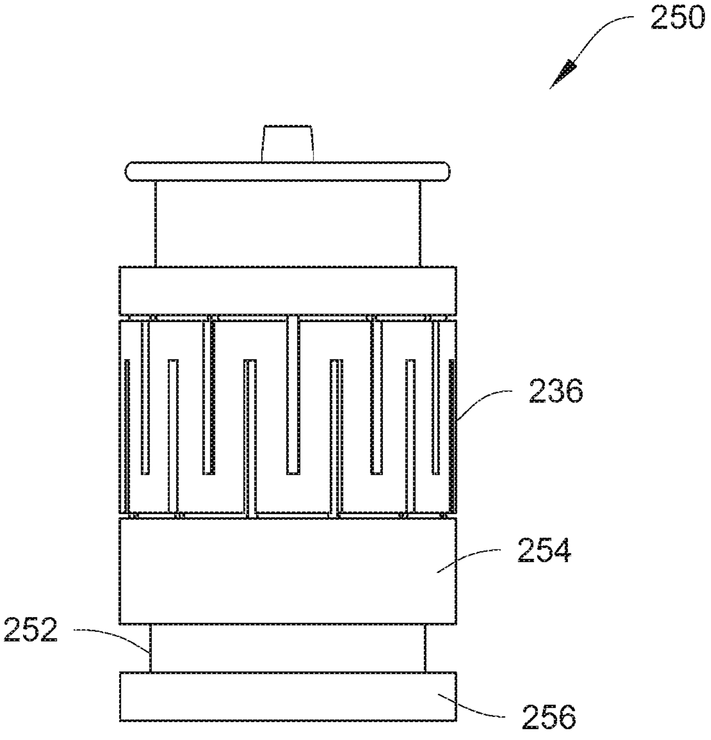

FIGS. 9A and 9B illustrate another example of a ribbon core 250 that is configured to accommodate build-up of material on a consumable ribbon, such as a print ribbon. The ribbon core 250 is similar in construction and operation to the ribbon core 220 of FIGS. 8A-B, and like elements are referenced using the same reference numerals. In addition to the collet sleeve 236 of the second axial section, the ribbon core 250 further includes a reduced diameter axial section 252 that breaks up the third axial section 238 of FIGS. 8A-B into separate third and fifth axial sections 254, 256. The construction and function of the ribbon core 250 is otherwise the same as the ribbon core in FIGS. 8A-B.

Figure 13:
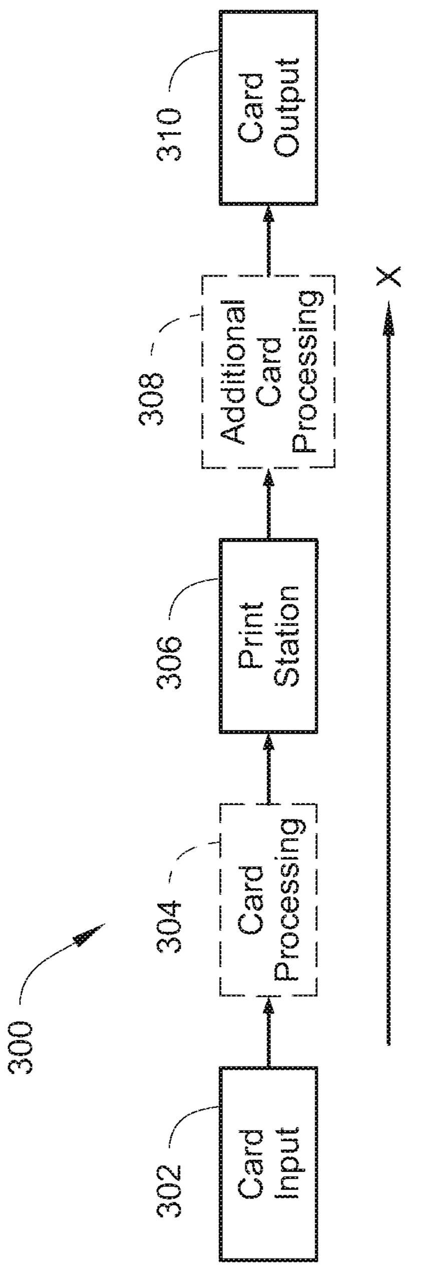
FIG. 13 depicts an example of a card processing system that can use the ribbon cores described herein.

As indicated above, the ribbon cores described herein can be used in various identification document processing mechanisms of identification document processing systems. In general, the ribbon cores described herein can be used in any identification document processing mechanism that uses a ribbon that needs to be wound onto a ribbon core (either to supply the ribbon or to take up used ribbon). FIG. 13 is a schematic depiction of one embodiment of a large volume batch production identification document processing system 300 that can use the ribbon cores described herein during processing of documents such as cards (and passports). The document processing system 300 is configured to process multiple documents at the same time, with the documents being processed in sequence, with the documents proceeding generally along a document transport direction/transport path X. The type of system 300 depicted in FIG. 13 is often referred to as a central issuance processing system that processes documents in high volumes, for example on the order of high hundreds or thousands per hour, and employs multiple processing stations or modules to process multiple documents at the same time to reduce the overall per document processing time. Examples of such large volume document processing machines include the MX and MPR family of central issuance processing machines available from Entrust Corporation of Shakopee, Minnesota. Other examples of central issuance processing machines are disclosed in U.S. Pat. Nos. 4,825,054, 5,266,781, 6,783,067, and 6,902,107, all of which are incorporated herein by reference in their entirety.

For sake of convenience, the system 300 will be described and illustrated as processing plastic cards. The system 300 in FIG. 13 can include a card input 302, one or more optional card processing stations 304 downstream from the card input 302, a print station 306 that can be similar to the retransfer print station of FIG. 11 or it can be any other print station that would use one or more of the ribbon cores described herein, one or more optional additional card processing stations 308, and a card output 310. The system 300 can include additional processing stations as would be understood by persons of ordinary skill in the art.

The card input 302 can be configured to hold a plurality of plastic cards waiting to be processed and that mechanically feeds the cards one by one into the system 300 using a suitable card feeder. In one embodiment, the card input 302 can be an input hopper. In another embodiment, the card input 302 can be an input slot through which individual cards are manually or automatically fed for processing. The cards are initially introduced into the one or more optional card processing stations 304 if they are present in the system. The station(s) 304, if present, can include a chip testing/programming device that is configured to perform contact or contactless testing of an integrated circuit chip on each card to test the functionality of the chip, as well as program the chip. Testing the functionality of the chip can include reading data from and/or writing data to the chip. In one embodiment, the chip testing/programming device can be configured to simultaneously program the chips on a plurality of cards. The construction and operation of chip testing/programming devices in document processing systems is well known in the art. The station(s) 304 can also include a magnetic strip read/write testing device that is configured to read data from and/or encode data on a magnetic strip on each card (if the cards include a magnetic strip). The construction and operation of magnetic strip read/write testing devices in document processing systems is well known in the art.

The print station 306 is configured to perform a printing operation. The print station 306 can have any configuration suitable for using one or more the ribbon cores described herein. In one embodiment, the print station 306 can be configured and operate like the retransfer print station described above in FIG. 11. Alternatively, the print station 306 can be a direct to card thermal printer. An example of a direct to card thermal printer is described in U.S. Pat. No. 10,889,129 the entire contents of which are incorporated herein by reference. In an embodiment, an optional curing mechanism or station can be provided that is configured to generate and apply radiation, such as ultraviolet radiation or other radiation, to radiation curable material that is applied to the card in the print station 306 to cure the radiation curable material.

The one or more additional card processing stations 308 can be stations that are configured to perform any type of additional card processing. Examples of the additional card processing stations 308 include, but are not limited to, an embossing station having an embosser configured to emboss characters on the cards, an indent station having an indenter configured to indent one or more characters on the cards, a lamination station with a laminator configured to apply one or more laminates to the cards, a security station with a security feature applicator configured to apply one or more additional security features to one or more of the surfaces of the cards, and one or more card reorienting mechanisms/flippers configured to rotate or flip a card 180 degrees for processing on both sides of the cards.

The card output 310 can be configured to hold a plurality of cards after they have been processed. In this configuration, the card output 310 is often termed a card output hopper. The construction and operation of output hoppers is well known in the art. In another embodiment, the card output 310 can be an output slot.

Figure 14:
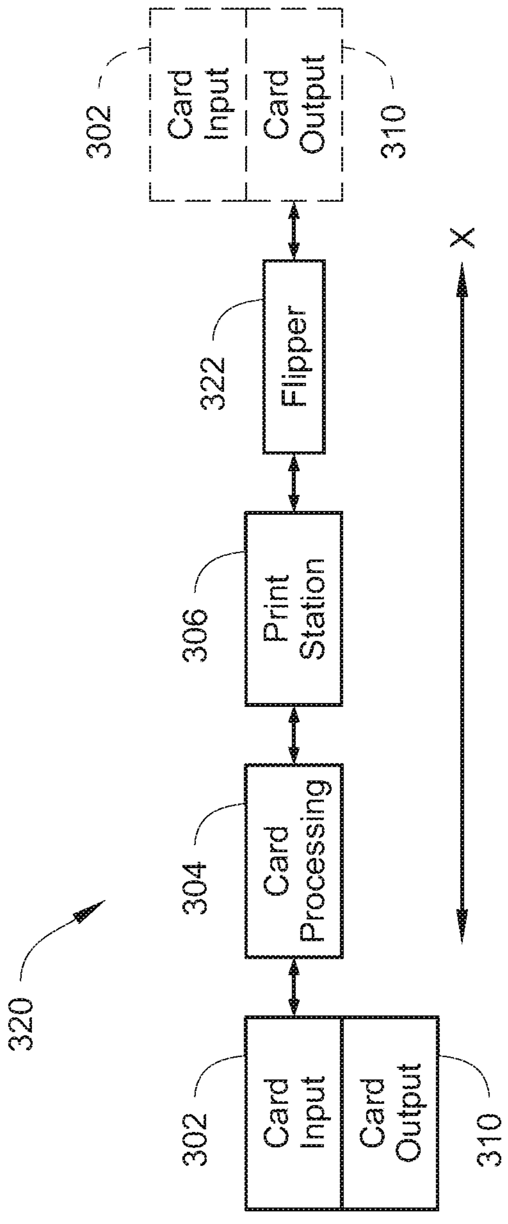
FIG. 14 depicts another example of a card processing system that can use the ribbon cores described herein.

FIG. 14 is a schematic depiction of another embodiment of a document processing system 320 that can be used to process documents such as cards (or passports). In this embodiment, the card processing system 320 can be configured as a desktop card processing system that is typically designed for relatively smaller scale, individual card personalization in relatively small volumes, for example measured in tens or low hundreds per hour, often times with a single card being processed at any one time. These card processing machines are often termed desktop processing machines because they have a relatively small footprint intended to permit the processing machine to reside on a desktop. Many examples of desktop processing machines are known, such as the SIGMA™ and ARTISTA™ family of desktop card printers available from Entrust Corporation of Shakopee, Minnesota. Other examples of desktop processing machines are disclosed in U.S. Pat. Nos. 7,434,728 and 7,398,972, each of which is incorporated herein by reference in its entirety.

In FIG. 14, elements in the system 320 that are similar in construction or functionality to elements in the system 300 in FIG. 13 are referred to using the same reference numerals. In FIG. 14, the system 320 is illustrated as including the card input 302 and the card output 310 at one end of the system 320. In the type of system depicted in FIG. 14, the card input 302 and/or the card output 310 can be provided at other locations in the system 320. For example, in one embodiment, the card input 302 can be located at a position higher up in the system, for example at the top of the system above the transport path X between the ends of the system 320. In another embodiment as depicted in dashed lines in FIG. 14, the card input 302 and the card output 310 can be located at the opposite end of the system 320.

The one or more optional card processing stations 304 can be positioned in the system 320 as illustrated in FIG. 14. In an embodiment, a card flipper 322 can be provided at the end of the system 320 that is configured to flip or rotate the card 180 degrees so that the card surface previously facing upward is now facing downward, and the card surface previously facing downward is now facing upward. The card is then transported in reverse back toward the print station 306 and the other processing stations for additional processing on the now upwardly facing card surface and ultimately transported to the output 310. If the card flipper 322 is not present, the card can simply be reversed in direction after printing is finished, and the card ultimately transported to the output 310.

In the systems 300, 320 in FIGS. 13 and 14, the cards can be transported throughout the systems 300, 320 and moved along the card transport path X by one or more suitable mechanical transport mechanisms (not shown). Mechanical transport mechanism(s) for transporting cards and passports in processing equipment of the type described herein are well known in the art. Examples of mechanical transport mechanisms that could be used are known in the art and include, but are not limited to, transport rollers, transport belts (with tabs and/or without tabs), vacuum transport mechanisms, transport carriages, and the like and combinations thereof. Transport mechanisms for plastic cards are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of transport mechanisms that could be used, as well as the construction and operation of such transport mechanisms.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A ribbon core upon which a consumable ribbon of a card processing system is wound, comprising:

a core body around which the consumable ribbon of the card processing system is intended to be wound, the core body having a first axial end and a second axial end;

the core body has a first axial section that during use is overlapped by a first section of the consumable ribbon and having a first circumferential shape, and a second axial section that during use is overlapped by a second section of the consumable ribbon, the second axial section has a second circumferential shape that differs from the first circumferential shape of the first axial section or the second axial section is configured to automatically change its circumferential shape when the second section of the consumable ribbon is wound thereon, whereby the second axial section accommodates uneven material on the second section of the consumable ribbon of the card processing system.

2. The ribbon core of claim 1, wherein the ribbon core is a take-up core upon which the consumable ribbon is wound during operation of the card processing system and the uneven material occurs during use of the consumable ribbon in the card processing system, or the ribbon core is a supply core from which the consumable ribbon is unwound during operation of the card processing system.

3. The ribbon core of claim 1, wherein the first axial section is at the first axial end, and the second axial section is between the first axial section and the second axial end.

4. The ribbon core of claim 3, wherein the core body further comprises a third axial section that is overlapped by a third section of the consumable ribbon and having the first circumferential shape, the third axial section is between the second axial section and the second axial end.

5. The ribbon core of claim 1, wherein the first circumferential shape is cylindrical with a fixed diameter, and the second circumferential shape is cylindrical with a diameter that can automatically change during use of the ribbon core.

6. The ribbon core of claim 5, wherein the diameter of the second axial section is less than the fixed diameter of the first axial section.

7. A ribbon supply of a card processing system, comprising:

a core body having a first axial end and a second axial end;

a consumable ribbon wound onto the core body;

the core body has a first axial section that is overlapped by a first section of the consumable ribbon and having a first circumferential shape, and a second axial section that is overlapped by a second section of the consumable ribbon and having a second circumferential shape that differs from the first circumferential shape of the first axial section, whereby the second axial section accommodates uneven material on the second section of the consumable ribbon of the card processing system.

8. The ribbon supply of claim 7, wherein the core body is a take-up core and the consumable ribbon is used ribbon that was used during operation of the card processing system, or the core body is a supply core and the consumable ribbon is unused ribbon to be used during operation of the card processing system.

9. The ribbon supply of claim 7, wherein the first axial section is at the first axial end, and the second axial section is between the first axial section and the second axial end.

10. The ribbon supply of claim 9, wherein the core body further comprises a third axial section that is overlapped by a third section of the consumable ribbon and having the first circumferential shape, the third axial section is between the second axial section and the second axial end.

11. The ribbon supply of claim 7, wherein the first circumferential shape is cylindrical with a fixed diameter, and the second circumferential shape is cylindrical with a diameter that is less than the fixed diameter.

12. The ribbon supply of claim 7, wherein the consumable ribbon is a print ribbon, and the uneven material comprises built-up transferrable material from an intermediate transfer film.

13. A shape changing ribbon core upon which a consumable ribbon of a card processing system is wound, comprising:

a substantially cylindrical core body having a first axial end and a second axial end;

the substantially cylindrical core body has a first axial section having a first diameter, and a second axial section having a second diameter, wherein in use the consumable ribbon overlaps the first axial section and the second axial section;

the second axial section is configured so that the second diameter can automatically change relative to the first diameter as the consumable ribbon is wound onto or unwound from the substantially cylindrical core body during operation of the card processing system.

14. The shape changing ribbon core of claim 13, wherein the substantially cylindrical core body is a take-up core upon which the consumable ribbon is wound during operation of the card processing system or a supply core from which the consumable ribbon is unwound during operation of the card processing system.

15. The shape changing ribbon core of claim 13, wherein the first axial section is at the first axial end, and the second axial section is between the first axial section and the second axial end.

16. The shape changing ribbon core of claim 15, wherein the substantially cylindrical core body further comprises a third axial section having the first diameter, the third axial section is between the second axial section and the second axial end.

* * * * *